United States Patent
Schermanz et al.

(10) Patent No.: US 8,975,206 B2
(45) Date of Patent: Mar. 10, 2015

(54) CATALYST COMPOSITION FOR SELECTIVE CATALYTIC REDUCTION OF EXHAUST GASES

(75) Inventors: Karl Schermanz, Launsdorf (AT);
Amod Sagar, Althofen (AT);
Alessandro Trovarelli, Pagnacco (IT);
Marzia Casanova, Ravascletto (IT)

(73) Assignee: Treibacher Industrie AG, Treibach-Althofen (AT)

( * ) Notice: Subject to any disclaimer, the term of this patent is extended or adjusted under 35 U.S.C. 154(b) by 211 days.

(21) Appl. No.: 13/641,402

(22) PCT Filed: Apr. 12, 2011

(86) PCT No.: PCT/AT2011/000176
§ 371 (c)(1),
(2), (4) Date: Oct. 15, 2012

(87) PCT Pub. No.: WO2011/127505
PCT Pub. Date: Oct. 20, 2011

(65) Prior Publication Data
US 2013/0040808 A1    Feb. 14, 2013

(30) Foreign Application Priority Data
Apr. 16, 2010    (AT) .................................. A 624/2010

(51) Int. Cl.
*B01J 23/00*    (2006.01)
*B01J 23/10*    (2006.01)
(Continued)

(52) U.S. Cl.
CPC ............. *B01J 23/22* (2013.01); *B01D 53/9418* (2013.01); *B01D 2255/20723* (2013.01);
(Continued)

(58) Field of Classification Search
CPC ........ B01J 23/22; B01J 23/8472; B01J 23/10; B01J 23/70–23/8993; B01J 23/16–23/36; B01D 53/9418; B01D 2255/2098; B01D 2255/20738; B01D 2255/2096
USPC .......... 502/302, 324, 336, 338, 350, 351, 353
See application file for complete search history.

(56) References Cited

U.S. PATENT DOCUMENTS 4,221,768 A    9/1980    Inoue et al.
4,466,947 A    8/1984    Imanari et al.
(Continued)

FOREIGN PATENT DOCUMENTS

EP    0 787 521 A1    8/1997
EP    1 145 762 A1    10/2001
(Continued)

OTHER PUBLICATIONS

International Search Report issued in International Application No. PCT/AT2011/000176 dated Jul. 12, 2011.
(Continued)

*Primary Examiner* — Anthony J Zimmer
(74) *Attorney, Agent, or Firm* — Greenberg Traurig, LLP

(57) ABSTRACT

A catalyst composition comprising a vanadate represented by the formula $XVO_4/S$, wherein $XVO_4$ stands for a Bi-, Sb-, Ga- and/or Al-vanadate optionally in mixture with one or more rare earth metal-vanadates, or in mixture with one or more transition metal-vanadates, or in mixture with one or more transition metal-vanadates and one or more rare earth metal-vanadates, and S is a support comprising $TiO_2$, optionally in combination with a dopant and a process for the preparation of such catalyst compositions.

4 Claims, 1 Drawing Sheet

(51) Int. Cl.
*B01J 23/32* (2006.01)
*B01J 23/70* (2006.01)
*B01J 23/74* (2006.01)
*B01J 23/22* (2006.01)
*B01D 53/94* (2006.01)
*B01J 23/847* (2006.01)

(52) U.S. Cl.
CPC ............... *B01D 2255/20738* (2013.01); *B01D 2255/2092* (2013.01); *B01D 2255/2096* (2013.01); *B01D 2255/2098* (2013.01); *B01J 23/8472* (2013.01)
USPC ........... 502/353; 502/302; 502/324; 502/336; 502/338; 502/350; 502/351

(56) References Cited

U.S. PATENT DOCUMENTS

| | | | |
|---|---|---|---|
| 4,828,807 A | 5/1989 | Domesle et al. | |
| 5,540,047 A | 7/1996 | Dahlheim et al. | |
| 6,805,849 B1 | 10/2004 | Andreasson et al. | |
| 2005/0038299 A1* | 2/2005 | Wachs et al. | 568/472 |
| 2007/0129241 A1* | 6/2007 | Schermanz et al. | 502/240 |
| 2008/0234126 A1 | 9/2008 | Hong et al. | |

FOREIGN PATENT DOCUMENTS

| | | |
|---|---|---|
| GB | 1 430 730 A | 4/1976 |
| GB | 1 495 396 A | 12/1977 |
| GB | 2 149 680 A | 6/1985 |
| WO | 2005/023398 A1 | 3/2005 |
| WO | 2005046864 A1 | 5/2005 |
| WO | 2010/121280 A1 | 10/2010 |

OTHER PUBLICATIONS

Köcher, "Aspects of Catalyst Development for Mobile Urea-Scr Systems—From Vanadia-Titania Catalysts to Metal-Exchanged Zeolites", Past and Present in DeNOx Catalysis, 2007.

Rice et al., "Development of an Integrated NOx an PM Reduction Aftertreatment System: SCRi TM for Advanced Diesel Engines", SAE Technical Paper Series, SAE World Congress, Detroit, Michigan, Apr. 14-17, 2008.

Vatareck, "Argillon, Visions and Innovations: Catalysts Automotive Applications, Argillon", 3rd CTI Forum SCR Systems, Bonn, Apr. 9, 2008.

Jan et al., "Reduction of Nitrogen Oxides by Ammonia Over Iron-Containing Catalysts", Chemical Engineering & Technology, vol. 30, Iss. 10, pp. 1440-1444, Oct. 2007.

Giraud et al., "Technical Advantages of Vanadium SCR Systems for Diesel NOx in Emerging Markets", SAE Int. J. Fuels Lubr. 1(1): 488-494, 2009.

Muench et al., "Extruded Zeolite Based Honeycomb Catalyst for NOx Removal from Diesel Exhaust", SAE Technical Paper, 2008.

* cited by examiner

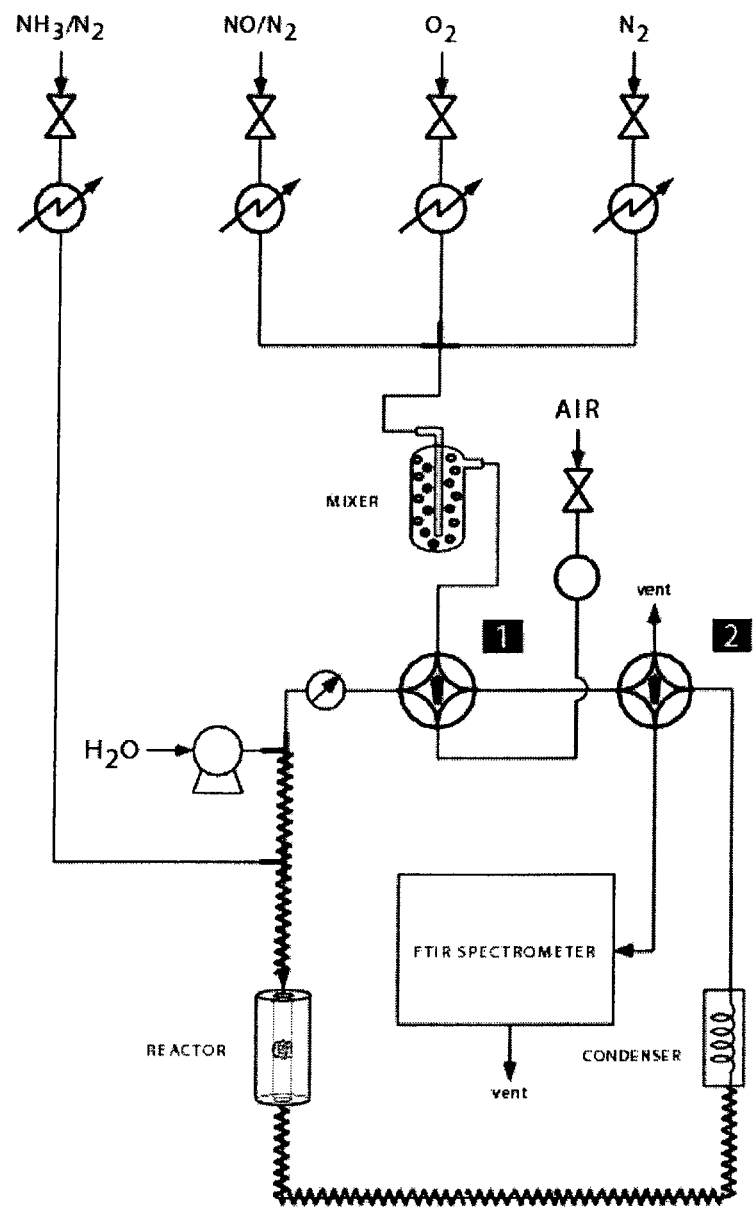

CATALYST COMPOSITION FOR SELECTIVE CATALYTIC REDUCTION OF EXHAUST GASES

RELATED APPLICATIONS

This application is a national phase filing under 35 U.S.C. 371 of International Application No. PCT/AT2011/000176, filed on Apr. 12, 2011, which claims the benefit of Austrian Patent Application No. A624/2010 filed on Apr. 16, 2010, the entirety of these applications is hereby incorporated herein by reference for the teachings therein.

The present invention relates to a catalyst composition for selective catalytic reduction of exhaust gases, in the following "catalyst composition" and a process for its preparation. Such a catalyst composition may be used in catalyst application for the removal of $NO_x$, particularly in exhaust gas aftertreatment of diesel- and lean burn engines of automotives. In addition the catalyst composition may also be used in stationary applications (e.g. removal of $NO_x$ in power plant stations).

The most widely employed technology for removal of $NO_x$ out of exhaust gases is S(elective) C(atalytic) R(eduction), e.g. O. Kröcher, Chapter 9 in «Past and Present in DeNOx Catalysis», edited by P. Granger et al., published by Elsevier 2007. Accordingly, $NO_x$ is removed by use of ammonia to provide nitrogen and water according to the reaction:

$$4NO+4NH_3+O_2=4N_2+6H_2O$$

For the stationary application mainly $V_2O_5$ doped $TiO_2/WO_3$ compositions are used commercially since 1970 to remove nitrogen oxide emissions from fossil fuel power plants.

Already 15 years ago, the idea was discussed to apply SCR also on mobile diesel engines, which is now an emerging technology for the NOx reduction from heavy duty diesel vehicles, passenger cars and off road machines.

A typical SCR system consists of a reduction catalyst, urea injection and dosing components, pipes and a storage tank. A huge number of modern catalysts are extruded substrates or coated substrates with vanadium pentaoxide ($V_2O_5$) as the catalytically active component.

Catalytic coatings of zeolite based SCR are currently being developed because of the limited temperature stability of the vanadium catalysts and the fact that vanadium pentaoxide ($V_2O_5$) has been classified as a health risk in some countries. Increased temperature stability is especially important in SCR catalysts installed downstream a particulate filter since relatively high temperatures are generated during filter regeneration (M. Rice, R. Mueller at al, Development of an Integrated NOx and PM Reduction Aftertreatment System: SCRi for Advanced Diesel Engines, SAE technical paper 2008-01-132, SAE World Congress Detroit, Mich. Apr. 14-17, 2008)

There are further reports on the commercially applied well known $V_2O_5/WO_3$—$TiO_2$ material for exhaust gas aftertreatment of automotives by O. Kröcher in Chapter 9, p. 267f in «Past and Present in DeNOx Catalysis», edited by P. Granger et al.

According to the presentation given by Dirk Vatareck (Catalysts Automotive Applications, Argillon) at the $3^{rd}$ CTI Forum SCR Systems (Bonn 9 Apr. 2008) titania-tungsten oxide based catalysts containing $V_2O_5$ as active component are applied for making automotive catalysts in a huge number (approx. 4 Mio. catalysts/year).

The preparation of $V_2O_5$ containing materials based on $TiO_2/WO_3$ which additionally may contain oxides out of transition metals, rare earth metals and other elements and the application in SCR is widely disclosed in numerous publications, patent applications and patents. For example in GB 1 495 396 there is described a catalyst composition containing as active ingredients oxides from titanium, at least one of molybdenum, tungsten, iron, vanadium, nickel, cobalt, copper, chromium and uranium, and as optional component(s) tin and/or at least one of silver, beryllium, magnesium, zinc, boron, aluminium, yttrium, rare earth metal, silicon, niobium, antimony, bismuth, manganese, thorium and zirconium, which oxides are present as an intimate mixture.

In EP 787 521 the preparation of several V-containing catalysts based on $TiO_2/WO_3$ containing additional dopants such as $Y_2O_3$, $B_2O_3$, $PbO$, $SnO_2$, wherein the vanadium is present as vanadium pentaoxide ($V_2O_5$) is described.

In U.S. Pat. No. 4,221,768 there are reported $V_2O_5$ containing materials based on $TiO_2$ as a support material and additional oxides out of transition metals as dopants. SCR-materials which contain $V_2O_5$ supported on $TiO_2$ are also described in GB 1 430 730.

$V_2O_5$ containing materials which contain $TiO_2$, $SiO_2$, S and oxides of Ce, Sn, Mo and W are reported in GB 2 149 680.

In U.S. Pat. No. 4,466,947 vanadium containing denitration catalysts in which the vanadium is present in the form of an oxide or a sulphate are described.

In EP 1 145 762 a process for the preparation of a vanadia SCR-catalyst supported on titania is disclosed.

The main disadvantage of the vanadium based catalyst type is the limited stability at temperatures above 600° C.

A report on the stability of an SCR system based on $TiO_2/WO_3/V_2O_5$ was presented by Jan M T et al. in Chemical Engineering & Technology, Vol. 30, No 10, 1440-1444, 2007, according to which deactivation of the catalyst occurs since $V_2O_5$ melts at approx. 650° C.

A $TiO_2/WO_3/V_2O_5$ suitable SCR catalyst for $NO_x$ removal from diesel-powered vehicles is described in U.S. Pat. No. 6,805,849, column 2. Although such catalysts are described to show good performance it was found that sustained high temperature operation can cause catalyst deactivation. Heavy duty diesel engines, which are almost exclusively charged can produce exhaust gases at a temperature greater than 500° C. Under conditions of high load and/or high speed and at such high temperatures deactivation of the catalyst may occur.

In the presentation of Dirk Vatareck (Catalysts Automotive Applications, Argillon) at the $3^{rd}$ CTI Forum SCR Systems (Bonn 9 Apr. 2008) there were reported maximum operation temperatures for a $TiO_2/WO_3/V_2O_5$ catalyst of 550° C. and 580° C. on short term basis. Ibidem, in view of the application under EURO 6, there was reported an improvement in thermal stability of a catalyst containing $V_2O_5$ as an active component, a support material consisting of $TiO_2/WO_3$ and additionally containing Si. Such catalysts are reported to be operated at maximum temperatures of 600° C. and 650° on a short term basis.

Vanadium based systems with improved thermal stability are also reported by James. W. Girard et al., "Technical Advantages of Vanadium SCR Systems for Diesel $NO_x$ Control in Emerging Markets", SAE technical paper 2008-01-132, SAE World Congress Detroit, Mich. Apr. 14-17, 2008. After ageing at 600° C. for 50 hours the catalyst is described to be still active. However, because of possible high exhaust gas temperatures during active Diesel Particulate Filter (DPF) regeneration, vanadium based SCR catalysts are usually not considered for these applications.

With increasingly stringent automobile exhaust emission regulations for diesel vehicles (US 2010 and EURO 6 regulations) aftertreatment systems containing a Diesel Particulate Filter (DPF) as well as a SCR catalyst may be required in future. Such systems will demand a higher temperature stability of the SCR catalyst and $V_2O_5$ based systems are not considered to be viable for such an application since additionally to the problem of heat stability $V_2O_5$ may be exhausted also to the environment (J. Münch et al "Extruded Zeolite based Honeycomb Catalyst for $NO_x$ Removal from Diesel Exhaust, SAE Paper 2008-01-1024). Since the activity of SCR catalysts in the temperature range of 180-350° C. is important in the diesel application there have been established systems to improve catalytic activity in the low temperature range.

For example, with the aid of a diesel oxidation catalyst (DOC) attached in front of the SCR system, NO (being present as a majority, namely more than 90% in the raw emission of the diesel engine) is oxidized to form $NO_2$. That $NO_2$ can be used to burn up particulates and to improve the low temperature activity (in the range of 180-350° C.), see M. Rice, R. Mueller at al., Development of an Integrated $NO_x$ and PM Reduction Aftertreatment System: SCRi for Advanced Diesel Engines, SAE technical paper 2008-01-132, SAE World Congress Detroit, Mich. Apr. 14-17, 2008. In the same publication there are summarized the design parameters of two engine/aftertreatment scenarios for US 2010/Euro 6 regulation. One concept will lead to high particulate matters/low $NO_x$ with active regeneration of the PM (particulate matter)-filter. The SCR catalyst proposed for the described scenario is a zeolite. Zeolites must be used since higher heat resistance of the SCR system is required due to the active regeneration of the PM filter.

The second concept comprises an engine concept which is expected to lead to low concentrations of PM and low $NO_x$ concentrations. The SCR catalyst may consist of a vanadium based material or a zeolite. Both concepts will use a diesel oxidation catalyst (DOC) prior to the SCR treatment.

The problem of low temperature activity of SCR catalysts is also addressed in US 2008/0234126 wherein there is described a method for the preparation of a vanadium/titania based catalyst with enhanced low temperature activity for removing nitrogen oxides at a window of 300° C. and lower. However, the stability problem of the catalyst >600° C. is not addressed.

An improvement in terms of the thermal stability of a V-containing $TiO_2/WO_3/SiO_2$ "SCR catalyst" is reported in WO 2005/046864. According to a preferred embodiment the vanadium in the formulations based on $TiO_2/WO_3/(SiO_2)$ is not present in the form of vanadium pentaoxide ($V_2O_5$) but in the form of a rare earth vanadate ($REVO_4$). The rare earth vanadate may be introduced to the support material ($TiO_2/WO_3/(SiO_2)$) in the form of a powder by simple mixing route of the support and the rare earth vanadate, followed by calcination of the mixture. Alternatively the rare earth vanadates may be formed in the composition also in situ during the preparation (calcination) of the catalyst composition from precursors eg. rare earth acetates and ammoniummetavanadate. The presence of the rare earth vanadates in the catalyst is proved by XRD.

The catalyst compositions referred to in WO 2005/046864 are described to exhibit good $NO_x$ conversion activity after being heat treated at 750° C./10 hours, whereas in contrast to that the reference material containing $V_2O_5$ on the $TiO_2/WO_3/SiO_2$ support may be considered to be almost inactive after being heat treated (aged) at 750° C./10 hours. However, in WO 2005/046864 there is not described any $NO_x$ conversion rate below 250° C., eg at 230° C. and 200° C., which is important for the automotive SCR systems. As shown in comparative example 2 of the present application an $ErVO_4$ doped $TiO_2/WO_3/SiO_2$ composition, which refers to Example 18, Table 2b of WO 2005/046864, was subjected to $NO_x$ conversion test at temperatures at 200° C. and 230° C. $NO_x$ conversion was found to be zero at 200° and 230° C. and 25% at 250° C. for the "fresh" material. After heat treatment at 700° C./10 hours there was found an increase of catalytic activity exhibiting a relatively low $NO_x$ conversion at 200° C. and 230° C. being 6% and 20% respectively; and at 250° C. there was measured a conversion rate of 55%.

Comparative example 1 of WO 2010/121280 (corresponds to comparative example 1 (C1) of the present application) refers to a commercially available catalyst containing $V_2O_5$ supported on $TiO_2/WO_3/SiO_2$ which is currently applied in heavy duty diesel SCR. After heat treatment at 650° C./2 hours the material is described still to exhibit activities. However the activity in the temperature range of 200-250° C. is already less than 50% and the activity drops significantly after heat treatment at 700° C./10 hours. In addition in comparative example 1.1 of WO 2010/121280 it is shown, that a $TiO_2/WO_3/SiO_2$: $V_2O_5$ catalyst is almost inactive after being heat treated at 750° C./10 hours.

As a summary from the prior art review it may be concluded that RE-vanadate doped $TiO_2/WO_3/SiO_2$ materials have better heat stability compared with the $V_2O_5$ doped materials but show a weakness in $NO_x$ conversion at operating temperatures below 300° C. $V_2O_5$ containing $TiO_2/WO_3/SiO_2$ materials seem to be operable up to 650° C. but loose already activity.

According to the present invention now surprisingly vanadium based compositions with improved heat resistance up to 700, preferably up to 800° C. and improved $NO_x$ activity below 300° C. compared with RE-vanadate prior art materials have been found.

In one aspect the present invention provides a catalyst composition comprising a vanadate represented by formula (I)

$$XVO_4/S \qquad \qquad I$$

wherein
$XVO_4$ stands for
(a) a Bi-, Sb-, Ga- and/or Al-vanadate, preferably a Bi-, Sb-, and/or Al-vanadate,
or
(b) a mixture of one or more of (a) with one or more rare earth metal-vanadates,
or
(c) a mixture of one or more of (a) with one or more transition metal-vanadates,
or
(d) a mixture of one or more of (a) with one or more transition metal-vanadates and one or more rare earth metal-vanadates,
and
S is a support comprising $TiO_2$.

A (catalyst) composition provided by the present invention herein is also designated as "a (catalyst) composition of (according to) the present invention".

In one aspect a catalyst composition of the present invention is represented by formula (I) wherein $XVO_4$ and S are as defined herein.

For the purpose of the present specification and claims the term "rare earth metal" means a rare earth metal element or a mixture thereof, e.g. more than one rare earth elements. According to IUPAC the rare earth elements are Sc, Y and the fifteen lanthanides La, Ce, Pr, Nd, Pm, Sm, Eu, Gd, Tb, Dy, Ho, Er, Tm Yb and Lu.

For the purpose of the present specification and claims the term "transition metal" means a transition metal element or a mixture thereof, i.e. more than one transition metal elements including, however, zinc. According to IUPAC a transition metal is an element whose atom has an incomplete d sub-shell, or which can give rise to cations with an incomplete d sub-shell and for the purpose of the present specification and claims, the term "transition metal" shall comprise the elements of groups 4-11 on the periodic table and additionally Zn, preferably the elements of groups 4-11.

S is a support comprising $TiO_2$. Preferably S is $TiO_2$, $TiO_2/WO_3$ (TW) or $TiO_2/WO_3/SiO_2$ (TWS). A further preferred embodiment of the catalyst composition according to the present invention is characterized in that S in formula (I) contains $TiO_2$ in an amount of at least 55 wt.-%, $WO_3$ in an amount of 1-20 wt.-%, and optionally $SiO_2$ in an amount of up to 20 wt.-%, said catalyst composition containing $XVO_4$ in an amount between 0.2% by weight and 25% by weight. Further preferred embodiments are characterized in that S contains $SiO_2$ in an amount of 4-15 wt.-%, particularly in an amount of 5-10 wt.-%.

In a further aspect the present invention provides a catalyst composition according to the present invention, further comprising a dopant, e.g. wherein a dopant is selected from
A. one or more non-transition metal vanadates,
B. mixtures of one or more non transition metal vanadates with one or more transition metal vanadates,
C. mixtures of one or more non-transition metal vanadates with one or more rare earth metal vanadates, or
D. mixtures of one or more non-transition metal vanadates with one or more transition metal vanadates and with one or more rare earth metal vanadates;
preferably one or more non-transition metal vanadates.

For the purpose of the present specification and claims the term "non-transition metal" means one or more metal elements other than transition metal elements, zinc or rare earth metal elements.

The content of the dopant in a catalyst composition of the present invention if present is in the range of 0.2% up to 25% by weight, e.g. from 1% to 15% by weight, typically around 10% by weight.

In preferred embodiments of the present invention a catalyst composition of the present invention comprises a vanadate of formula (I), wherein $XVO_4$ stands for
an Al-vanadate, Bi-vanadate, Sb-vanadate, or Ga-vanadate, e.g. an Al-vanadate, Bi-vanadate or Sb-vanadate,
a mixture of Al-vanadate with Bi-vanadate,
a mixture of Al-vanadate with Er-vanadate,
a mixture of Al-vanadate or Bi-vanadate with Fe-vanadate, or
a mixture of Al-vanadate or Bi-vanadate with Fe-vanadate and Er-vanadate.

Preferably a catalyst composition according to the present invention comprises one or more dopants which dopant comprises one or more non-transition metal vanadates, optionally in combination with one or more transition metal vanadates and/or one or more rare earth metal vanadates. Preferably a catalyst composition according to the present invention comprises as a dopant one or more non-transition metal vanadates.

In a catalyst composition according to the present invention a transition metal preferably is one or more, e.g. one, of Fe, Mn, Zr, more preferably Fe.

In a catalyst composition according to the present invention a rare earth metal preferably is one or more of Er, Gd, Sm or Y, e.g. Er or one of Gd, Sm or Y, more preferably Er.

Catalyst composition according to the present invention may be useful for exhaust gas after treatment of diesel and lean burn engines in combination with a particulate filter in future SCR systems.

Surprisingly a catalyst composition according to the present invention on a support S shows enhanced heat resistance and enhanced NO conversion activity when compared with prior art material. Heat resistance of a catalyst composition of the present invention eventually may be attributed to the inhibition of the formation of rutile out of anatase in the support material (TWS).

In one particular embodiment the present invention provides a catalyst composition on a $TiO_2/WO_3/SiO_2$ support and a vanadate selected from an Al-, Sb- and/or Ga-vanadate, optionally further comprising a transition metal vanadate such as Fe-vanadate. Such materials were found to exhibit an excellent low temperature activity after calcination of the catalysts at 650° C./2 hours which activity exceeds by far the activity of known catalyst compositions based on $V_2O_5$ and $ErVO_4$, e.g. as shown in the examples 1, 4 and 5 in Table D. Such materials are even more active than known catalysts after being aged at 700° C./10 hours, e.g. as shown in the examples in Table E.

Surprisingly it was found that the heat resistance of a catalyst composition of the present invention comprising Fe-vanadate increases significantly when compared with a catalyst in which the dopant is based on $FeVO_4$ only (see example 8 Table E, F and Table G).

A catalyst composition according to the present invention containing mixtures of Bi-vanadates with Fe-vanadate and additionally a rare earth metal vanadate such as Er-vanadate surprisingly was found to exhibit a significant improved catalytic activity after heat treatment at 700° C./10 hours. Such compositions (as demonstrated in example 7) are found to be more active in comparison with catalyst mixtures which contain the single vanadates of Fe or Er only, and even with catalyst mixtures according to the present invention which contain the single vanadate of Bi only (see example 2, C 2 and C 4 in Table E).

The present invention furthermore provides a process for the preparation of a catalyst composition of the present invention comprising the steps of
i) suspending a support material comprising, e.g. containing, $TiO_2$ and $XVO_4$, wherein $XVO_4$ is as defined above, in water to form an intimate mixture comprising said support material and said $XVO_4$,
ii) evaporating water, e.g. evaporating an excess of water,
iii) drying the mixture obtained in ii), e.g. at a temperature from 80 to 150° C.,
iv) calcining the dried mixture under air at a temperature from 500 to 850° C.;
v) optionally transforming the calcined powder into a shaped form; and/or optionally coating the calcined powder on a ceramic or metallic carrier, e.g. on a ceramic or metallic honeycomb.

A further preferred embodiment is characterized in that the vanadate of a composition of the present invention prior to the mixing with the support is pre-heattreated separately.

For the preparation of the vanadate dopants in a composition according to the present invention there was applied a wet chemical process which in principle is based on the method described in WO 2005/046864 and applies precipitation and co-precipitation method.

The catalyst compositions of the present invention, including such which comprise a dopant, based on the support $TiO_2/WO_3/SiO_2$ (TWS) are preferably produced by a process comprising the steps
(I) optionally pre-heattreating the vanadates at a temperature >350° C. and below the melting point, (II) suspending the support material TWS and the vanadate(s) in water to form an intimate mixture between the support (TWS) and the vanadate(s), (III) evaporating water, e.g. an excess of water, e.g. over several hours, (IV drying the mixture obtained in step (bc), e.g. at a temperature of 100° C. or more, e.g. 100 to 180° C., e.g. around 120° C., e.g. for approximately 10-16 hours, (V) calcining the mixture obtained in step (bd) under air at appropriate temperatures an appropriate period, e.g. including a temperature range from 500° C. up to 900° C., depending on the heat resistance of the vanadate, e.g. 650° C., e.g. for 2 to 120 hours, (VI optionally transforming the calcined powder into a shaped form; and/or (VII) optionally coating the calcined powder on a ceramic or metallic carrier, e.g. on a ceramic or metallic honeycomb.

In another aspect the present invention provides a catalyst composition represented by the general formula $$XVO_4/S$$

wherein
$XVO_4$ stands for a metal vanadate wherein the metal is Bi or Al, or Fe and Al, or Fe and Bi, optionally in mixture with a R are Earth-Vanadate, and
S is a support comprising $TiO_2$;
e.g. wherein R are Earth is Er, or is one of Sm, Gd and Y.

The structure of the catalyst compositions prepared according to the present invention was calculated based on the content of vanadium out of the amounts of support and dopant (both analytically well characterised) used for the preparation of the compositions.

The compositions were characterised on specific surface area and partly in terms of XRD structure.

The specific surface area of the materials were measured by BET method using $N_2$ adsorption/desorption at 77 K employing a Micromeritics Tristar apparatus, after pretreatment under vacuum at 150° C. for 1.5 hours.

XRD (X-ray diffraction) measurements were carried out by using a Philips X'Pert diffractometer using a Ni-filtered Cu Kα radiation at 40 KV and 40 mA.

For catalytic testing on $NO_x$ removal efficiency the compositions were subjected to catalytic testing.

Conditions for Catalytic Testing:

Sample Preparation

Powders yielded by the process according to the invention were pressed into pellets, crushed and sieved in the range 355-425 μm.

Heat Treatment (Ageing)

For the measurement of the catalytic activity after heat treatment the sieved powders were subjected to calcination (ageing) in a static muffle furnace under air atmosphere at 700° C./10 hours, 750° C./10 hours and partly at 800° C./10 hours.

Measurement of Catalytic Activity

The test was carried out in the apparatus described in FIG. 1. As a model feed gas for $NO_x$ component there was used NO only. More in detail the feed consisted of $NH_3/N_2$, $NO/N_2$, $O_2$, $N_2$. Mass flow meters were used to measure and control the single gaseous stream while an injection pump was used to introduce water. The feed stream was preheated and premixed and ammonia was added to the gaseous mixture immediately before entering the reactor to avoid side reactions. A tubular quartz reactor was employed inserted in a furnace. Temperature was controlled by a thermocouple inserted in the catalyst bed. Activity of the catalysts was measured under stationary as well as dynamic conditions (ramp 5° C./min) in a temperature range of 200° C. to 480° C. There were no major differences in the results between the 2 methods applied.

Gas composition analysis was carried out with an FT-IR spectrometer (MKS Multigas Analyzer 2030) equipped with a heated multi-pass gas cell (5.11 m).

TABLE 1

Reaction conditions and gas composition for catalytic testing

| | |
|---|---|
| Catalyst weight | 100.0 mg |
| Particle size | 355-425 μm |
| Total flow | 0.3 l/min |
| Space velocity | 180000 h$^{-1}$ |
| Temperature | 200-480° C. (Stationary or with ramp 3° C./min) |
| NO conc. | 200 ppm |
| $NH_3$ conc. | 220 ppm |
| $O_2$ conc. | 20000 ppm |
| $H_2O$ conc. | 10% |
| $N_2$ conc. | balance |

In the following preferred embodiments the invention is described more in detail.

Support Material—$TiO_2/WO_3/SiO_2$ (TWS)—DT 58

There was used a support material based on titaniumoxide which is doped with tungsten oxide and $SiO_2$. It is commercially available and was obtained from Cristal Global. It is known under the Trade name Tiona DT58.

For the preparation of the catalyst compositions there was used a material having the following characteristics:

Specific surface area (BET): 114 m²/g
$WO_3$: 8.8%
$SiO_2$: 9.9%
$TiO_2$: remainder
$SO_3$: 0.16%
$P_2O_5$: 0.05%

A synthesis for the support material is described in WO 2005/046864 A1.

Synthesis of Metal Vanadates

Compound 1: $BiVO_4$

The stoichiometric amount of bismuth-(III)-nitrate pentahydrate (74.88 g containing 48.03% $Bi_2O_3$) was suspended in 500 mL of deionised water. The suspension obtained was stirred for 5 minutes and to the mixture obtained concentrated nitric acid (130 mL) was added dropwise until a clear solution was obtained.

On the other hand, 17.91 g of ammonium metavanadate (AMV, containing 78.37% V2O5) were dissolved in 600 mL of deionised water at 80° C. The two solutions obtained were mixed under continuous stirring and the pH of the mixture obtained was adjusted to 7.25 by adding 24% aqueous ammonia solution. A precipitate formed and the suspension obtained was stirred for another half an hour and filtered. The solid obtained was washed several times with deionised water and dried at 120° C. overnight. 50 g of $BiVO_4$ were obtained and analytically characterised by XRD.

Compound 2: $SbVO_4$

The stoichiometric amount of antimony-(III)-chloride (48.18 g, containing 63.9% $Sb_2O_3$) was suspended in 500 mL of deionised water. The suspension obtained was stirred for 5 minutes and concentrated hydrochloric acid (180 mL) was added dropwise until a clear solution was obtained.

On the other hand, 24.74 g of ammonium metavanadate (AMV, containing 77.64% V2O5) were dissolved in 900 mL of deionised water at 80° C. The two solutions obtained were mixed under continuous stirring and the pH of the mixture obtained was adjusted to 7.25 by adding 24% aqueous ammonia solution. A precipitate formed and the suspension obtained was stirred for another half an hour and filtered. The solid obtained was washed several times with deionised water and dried at 120° C. overnight. 50 g of SbVO$_4$ were obtained, were calcined at 550° C./20 hours and analytically characterised by XRD analysis.

Compound 3: AlVO$_4$

The stoichiometric amount of aluminium nitrate nonahydrate (132.07 g, containing 13.6% Al2O3) was dissolved in 600 mL deionised water.

On the other hand, 41.27 g of ammonium metavanadate (AMV, containing 77.64% V2O5) were dissolved in 1200 mL of deionised water at 80° C. The two solutions obtained were mixed under continuous stirring and the pH of the mixture obtained was adjusted to 7.25 by adding 24% aqueous ammonia solution. A precipitate formed and the suspension obtained was stirred for another half an hour and filtered. The solid obtained was washed several times with deionised water and dried at 120° C. overnight. 50 g of AlVO$_4$ were obtained, calcined at 550° C./20 hours and analytically characterised by XRD.

Compound 4: Al$_{0.5}$ Bi$_{0.5}$ VO$_4$

The stoichiometric amount of bismuth-(III)-nitrate pentahydrate (31.24 g, containing 48.03% Bi$_2$O$_3$) was suspended in 250 mL of deionised water. The suspension obtained was stirred for 5 minutes and to the mixture obtained concentrated nitric acid (50 mL) was added dropwise until a clear solution was obtained. Also the stoichiometric amount of aluminium nitrate nonahydrate (24.14 g, containing 13.6% Al$_2$O$_3$) was dissolved in 100 mL of deionised water. In order to make mixed metal nitrate solution, both the solutions were mixed and stirred for 15 minutes at room temperature.

On the other hand, 15.09 g of ammonium metavanadate (AMV, containing 77.64% V2O5) were dissolved in 500 mL of deionised water at 80° C. The two solutions obtained were mixed under continuous stirring and the pH of the mixture obtained was adjusted to 7.25 by adding 24% aqueous ammonia solution. A precipitate formed and the suspension obtained was stirred for another half an hour and filtered. The solid obtained was washed several times with deionised water and dried at 120° C. overnight. 30 g of Al$_{0.5}$ Bi$_{0.5}$ VO$_4$ were obtained, calcined at 550° C./20 hours and analytically characterised by XRD.

EXAMPLE 5

Gallium Vanadate

The stoichiometric amount of gallium-(III)-nitrate hydrate (5.031 g) was dissolved in 80 mL of deionised water to yield gallium nitrate solution. On the other hand, 1.27 g of ammonium metavanadate were dissolved in 100 mL of deionised water at 80° C. The two solutions obtained were mixed under continuous stirring and the pH of the mixture obtained was adjusted to 7 by adding 24% aqueous ammonia solution. A precipitate formed and the suspension obtained was stirred for another half an hour and filtered. The solid obtained was washed several times with deionised water and dried at 120° C. overnight. 2 g of gallium vanadate were obtained and analytically characterised.

Compound 6: Bi$_{0.5}$ Fe$_{0.5}$ VO$_4$

The stoichiometric amount of bismuth-(III)-nitrate pentahydrate (29.42 g, containing 48.03% Bi$_2$O$_3$) was suspended in 250 mL of deionised water. The suspension obtained was stirred for 5 minutes and to the mixture obtained concentrated nitric acid (50 mL) was added dropwise until a clear solution was obtained. Also the stoichiometric amount of iron nitrate nonahydrate (25.14 g, containing 19.26% Fe$_2$O$_3$) was dissolved in 100 mL of deionised water. In order to make mixed metal nitrate solution, both the solutions were mixed and stirred for 15 minutes at room temperature.

On the other hand, 14.14 g of ammonium metavanadate (AMV, containing 78.01% V$_2$O$_5$) were dissolved in 500 mL of deionised water at 80° C. The two solutions obtained were mixed under continuous stirring and the pH of the mixture obtained was adjusted to 7.25 by adding 24% ammonia solution. A precipitate formed, the suspension obtained was stirred for another half an hour and filtered. The solid obtained was washed several times with deionised water and dried at 120° C. overnight. 30 g of Bi$_{0.5}$ Fe$_{0.5}$ VO$_4$. were obtained and characterised by elemental analysis.

Compound 7: Bi$_{0.1}$ Fe$_{0.4}$ Er$_{0.5}$ VO$_4$

The stoichiometric amount of bismuth-(III)-nitrate pentahydrate (10.03 g, containing 48.03% Bi$_2$O$_3$) was suspended in 100 mL of deionised water. The suspension was stirred for 5 minutes and then concentrated nitric acid (15 mL) was added dropwise until a clear solution was obtained. Also the stoichiometric amount of iron nitrate nonahydrate (34.29 g, containing 19.26% Fe$_2$O$_3$) and 47.19 g of erbium nitrate hexahydrate (containing 41.9% Er$_2$O$_3$) were dissolved in 200 mL deionised water.

In order to make mixed metal nitrate solution, both the solutions were mixed and stirred for 15 minutes at room temperature.

On the other hand, 24.11 g of ammonium metavanadate (AMV, containing 78.01% V$_2$O$_5$) were dissolved in 900 mL of deionised water at 80° C. The two solutions were mixed under continuous stirring, the pH of the mixture obtained was adjusted to 7.25 by adding 24% aqueous ammonia solution. A precipitate formed and the suspension obtained was stirred for another half an hour and filtered. The solid obtained was washed several times with deionised water and dried at 120° C. overnight. 50 g of Bi$_{0.1}$ Fe 0.4 Er$_{0.5}$ VO$_4$. were obtained and characterised by elemental analysis.

Compound 8: Al$_{0.2}$ Fe$_{0.8}$ VO$_4$

The stoichiometric amount of iron (III) nitrate nonahydrate (99.31 g, containing 19.49% Fe$_2$O$_3$) and aluminium (III) nitrate nonahydrate (22.72 g; containing 13.6% Al$_2$O$_3$) was suspended in 500 mL of deionised water. The suspension obtained was stirred for 5 minutes to obtain clear mixed metal nitrate solution.

On the other hand, 36.22 g of ammonium metavanadate (AMV, containing 76.07% V$_2$O$_5$) were dissolved in 1200 mL of deionised water at 80° C. The two solutions obtained were mixed under continuous stirring and the pH of the mixture obtained was adjusted to 7.25 by adding 24% aqueous ammonia solution. A precipitate formed and the suspension obtained was stirred for another half an hour and filtered. The solid obtained was washed several times with deionised water and dried at 120° C. overnight. 50 g of Al$_{0.2}$ Fe$_{0.8}$ VO$_4$ were obtained and characterised by elemental analysis.

Compound 9: Al$_{0.2}$ Er$_{0.8}$ VO$_4$

The stoichiometric amounts of erbium-(III)-nitrate hexahydrate (30.36 g; containing 41.4% Er$_2$O$_3$) and aluminium (III) nitrate nonahydrate (14.75 g; containing 13.6% Al$_2$O$_3$) were suspended in 500 mL of deionised water. The suspension obtained was stirred for 5 minutes to obtain a clear mixed metal nitrate solution.

On the other hand, 23.52 g of ammonium metavanadate (AMV, containing 76.07% V$_2$O$_5$) were dissolved in 950 mL of deionised water at 80° C. The two solutions were mixed under continuous stirring and the pH of the mixture obtained was adjusted to 7.25 by adding 24% aqueous ammonia solution. A precipitate formed and the suspension obtained was stirred for another half an hour and filtered. The solid obtained was washed several times with deionised water and dried at 120° C. overnight. 50 g of $Al_{0.2} Er_{0.8} VO_4$ were obtained and characterised by elemental analysis.

Compound 10: $Al_{0.1} Fe_{0.4} Er_{0.5} VO_4$

The stoichiometric amounts of erbium (III) nitrate hexahydrate (51.65 g; containing 41.4% $Er_2O_3$), iron (III) nitrate nonahydrate (36.64 g; containing 19.49% $Fe_2O_3$) and aluminium (III) nitrate nonahydrate (8.38 g; containing 13.6% $Al_2O_3$) were suspended in 600 mL of deionised water. The suspension obtained was stirred for 5 minutes to obtain a clear mixed metal nitrate solution.

On the other hand, 26.73 g of ammonium metavanadate (AMV, containing 76.07% $V_2O_5$) was dissolved in 900 mL of deionised water at 80° C. The two solutions were mixed under continuous stirring and the pH of the mixture obtained was adjusted to 7.25 by adding 24% aqueous ammonia solution. A precipitate formed and the suspension obtained was stirred for another half an hour and filtered. The solid obtained was washed several times with deionised water and dried at 120° C. overnight. 50 g of $Al_{0.1} Fe_{0.4} Er_{0.5} VO_4$ were obtained and characterised by elemental analysis.

$ErVO_4$ and $FeVO_4$ as applied in the comparative examples 2-6 were synthesized according to the description given in example 3, but instead of aluminum nitrate, Er-nitrate hexahydrate and Fe-nitrate-nona hydrate was used, respectively.

Preparation of Catalyst Compositions

Preparation of the Catalyst Compositions Using $TiO_2/WO_3/SiO_2$ (TWS) as a Support Material

EXAMPLE 1

Preparation of Catalyst Composition $TiO_2/WO_3/SiO_2$: $AlVO_4$

Two slurries were formed by suspending 8.4 g of $AlVO_4$ in 50 mL of deionised water and 91.6 g of $TiO_2/WO_3/SiO_2$ support material in 150 mL of deionised water. The two slurries were mixed and heated up to 90° C. while stirring. The slurry obtained was brought to dryness under continuous stirring at 80-100° C. and the residue was dried overnight at 120° C. followed by calcination at 650° C./2 hours under air in a muffle furnace. The mixture obtained was pressed into pellets, crushed and sieved in the range 355-425 μm. The catalyst composition thus obtained is designated as "fresh" material.

Ageing of the catalyst composition obtained was carried out by calcination of the material at a temperature of 700° C. for 10 hours in air in a muffle furnace.

The composition obtained refers to a calculated vanadium content of 3.0%. BET of the catalyst composition obtained was measured after calcination at 650° C. 2 hours (fresh material) and 700° C./10 hours (aged), and showed a value of 73 m²/g, or 8 m²/g respectively.

EXAMPLES 2-10

Preparation of Catalyst Compositions $TiO_2/WO_3/SiO_2$: $MeVO_4$ as Listed in Table A The catalyst compositions referred to in examples 2-10 and as disclosed in Table A below were prepared analogously to the procedure as disclosed in example 1 but using appropriate starting material.

The quantities of the support material $TiO_2/WO_3/SiO_2$ (TWS [g]) and the quantities of Me-vanadates (MeVO4 [g]) used for the preparation of the catalyst compositions prepared according to Examples 2 to 10 as well as the applied preheat and ageing temperatures in ° C. and preheat and ageing times in hours are listed in Table A below.

TABLE A

| Example | Preheat-treatment of Vanadate [° C./hours] | MeVO4 [g] | TWS [g] | Ageing ° C./hours |
|---------|---------|---------|---------|---------|
| 2 | none | 8.4 | 91.6 | 700/10 |
| 3 | 550/20 | 8.4 | 91.6 | 700/10 |
| 4 | 550/20 | 8.4 | 91.6 | 700/10 |
| 5 | none | 0.2523 | 2.7477 | 700/10; 750/10 |
| 6 | none | 8.4 | 91.6 | 700/10 |
| 7 | none | 8.4 | 91.6 | 700/10 |
| 8 | none | 0.2523 | 2.7477 | 700/10; 750/10 |
| 9 | none | 0.2523 | 2.7477 | 700/10; 750/10 |
| 10 | none | 0.2523 | 2.7477 | 800/10; 850/10 |

COMPARATIVE EXAMPLE 1

Commercial Catalyst Composition Based on $TiO_2/WO_3/SiO_2$: $V_2O_5$

A commercially available catalyst (monolith) based on the composition $TiO_2/WO_3/SiO_2$: $V_2O_5$ was crushed and sieved over 450 μm and 250 μm. The fractions from 250 μm to 450 μm were heat treated at 650° C./2 hours. Ageing of that "fresh" material was carried out by calcination of the material at a temperature of 700° C. for 10 hours in air.

COMPARATIVE EXAMPLE 2

Preparation of Catalyst Composition $TiO_2/WO_3/SiO_2$: $ErVO_4$

Two slurries were formed by dissolving 0.2523 g of $ErVO_4$ in 5 mL of deionised water and 2.7477 g of $TiO_2/WO_3/SiO_2$ support material in 10 mL of deionised water. The two slurries obtained were mixed and heated up to 90° C. while stirring. The slurry obtained was brought to dryness under continuous stirring at 80-100° C. and the residue obtained was dried overnight at 120° C. followed by calcination at 650° C./2 hours under air in a muffle furnace. The mixture obtained was pressed into pellets, crushed and sieved in the range of 355-425 μm. The material thus obtained is designated as "fresh" material. Ageing of the "fresh" material was carried out by calcination of the material at a temperature of 700° C. for 10 hours in air.

COMPARATIVE EXAMPLES 3 AND 4

Preparation of Catalyst Composition $TiO_2/WO_3/SiO_2$: $ErVO_4$ ($ErVO_4$-Pre-Heattreated)

The catalyst was prepared analogously as indicated in comparative example 2 but using $ErVO_4$ already pre heat treated at 700° C./20 hours (comparative example 3) and at 850° C./20 hours (comparative example 4).

COMPARATIVE EXAMPLE 5

Preparation of Catalyst Composition
$TiO_2/WO_3/SiO_2$: $FeVO_4$

The catalyst was prepared analogously to the method as indicated in comparative example 2 but using 0.2523 g $FeVO_4$ instead of $ErVO_4$.

COMPARATIVE EXAMPLE 6

Preparation of Catalyst Composition
$TiO_2/WO_3/SiO_2$: $FeVO_4$

The catalyst was prepared analogously as indicated in comparative example 2 but taking 0.5046 g of $FeVO_4$ (heat treated 700° C./20 hours prior to use) and 2.2431 g of $TiO_2/WO_3/SiO_2$ support.

COMPARATIVE EXAMPLE 7

Preparation of Catalyst Composition
$TiO_2/WO_3/SiO_2$: FeVO4

The catalyst was prepared analogously as indicated in comparative example 2 but using 0.2523 g of $FeVO_4$ (heat treated at 550° C./24 hours prior to use) and 2.7477 g of $TiO_2/WO_3/SiO_2$ support.

The calculated vanadium-content (V-content in %) of the catalyst compositions prepared according to examples (EX) 2-10 (using the compounds 2 to 10) as well as for the comparative examples 1-7 (C1-C7) is set out in Table B below. In Table B also the preheat treatment temperatures of the vanadates (in ° C.) and the preheat treatment time (in hours) are indicated. There are also listed several BET values in [m²/g] reported for the materials calcined at different temperatures (in ° C.) and times (in hours) as indicated in Table B.

TABLE B

| EX | Preheat-treatment of Vanadate [° C./hours] | V-content [%] | BET 650°/ 2 hours [m²/g] | BET 700°/ 10 hours [m²/g] | BET 750°/ 10 hours [m²/g] |
|---|---|---|---|---|---|
| 2 | none | 1.32 | 89 | 67 | |
| 3 | 550/20 | 1.84 | 89 | 66 | |
| 4 | 550/20 | 1.81 | 85 | 42 | |
| 5 | none | 2.3 | 82 | 55 | 28 |
| 6 | none | 1.7 | 82 | 15 | |
| 7 | none | 1.77 | 87 | 60 | |
| 8 | none | 2.6 | 75 | | 45 |
| 9 | none | 1.7 | 93 | | 62 |
| 10 | none | 1.9 | | 18/800° C./ 10 hours | |
| C 1 | none | 1.7 | 66 | 31 | 7 |
| C 2 | none | 1.52 | 68 | 26 | 8 |
| C 3 | 700/20 | 1.52 | 91 | | |
| C 4 | 850/20 | 1.52 | 91 | | |
| C 5 | none | 2.5 | 63 | 15 | 4 |
| C 6 | 700/20 | 4.5 | | | |
| C 7 | 550/24 | 2.5 | 81 | 38 | |

Catalytic Testing:

The Catalytic Test was performed according to the parameters (reaction conditions and gas composition) disclosed in Table C below.

TABLE C

| | |
|---|---|
| Catalyst weight | 100.0 mg |
| Particle size | 355-425 μm |
| Total flow | 0.3 l/min |
| Space velocity | 180.000 h⁻¹ |
| Temperature | 200-480° C. |
| NO conc. | 200 ppm |
| $NH_3$ conc. | 220 ppm |
| $O_2$ conc. | 20000 ppm |
| $H_2O$ conc. | 10% |
| $N_2$ conc. | balance |

Results of Catalytic Measurement of Vanadate Doped TWS Formulations ($TiO_2/WO_3/SiO_2$: $MeVO_4$)

Table D below shows the $NO_x$ removal efficiency ($NO_x$ conversion in %) of the compositions prepared according to examples 1-10 (EX 1 to 10) as well as of the compositions prepared according to comparative example 1, 2 and 3 (C 1 to C3) after heat treatment of the powder at 650° C./2 hours in % at temperatures (in ° C.) as indicated in Table D. Also indicated in Table D is an optional preheat treatment of the vanadates in ° C. for a defined time in hours. The catalytic test results showed that all the materials of the examples 1-10 showed a better activity compared with the material of comparative example 2. Some of the materials, particularly aluminium vanadate and gallium vanadate containing catalyst composition referred to in example 6 exhibited a significant better catalytic activity when compared with the material of comparative example 1 and comparative example 2.

TABLE D

| EX | Preheat- of vanadate [° C./hrs] | [%] at 200° C. | [%] at 230° C. | [%] at 250° C. | [%] at 270° C. | [%] at 300° C. | [%] at 320° C. | [%] at 350° C. | [%] at 380° C. | [%] at 420° C. | [%] at 450° C. | [%] at 480° C. |
|---|---|---|---|---|---|---|---|---|---|---|---|---|
| 1 | 550/20 | 57 | 85 | 87 | 88 | 92 | 94 | 95 | 81 | 55 | 39 | 24 |
| 2 | none | 1 | 3 | 6 | 11 | 22 | 33 | 49 | 61 | 69 | 70 | 69 |
| 3 | 550/20 | 1 | 6 | 12 | 21 | 39 | 50 | 64 | 73 | 72 | 72 | 69 |
| 4 | 550/20 | 19 | 47 | 67 | 81 | 92 | 93 | 92 | 87 | 76 | 60 | 40 |
| 5 | none | 30 | 61 | 78 | 89 | 96 | 98 | 95 | 85 | 72 | 60 | 47 |
| 6 | none | 10 | 36 | 53 | 70 | 85 | 89 | 93 | 93 | 91 | 85 | 73 |
| 7 | none | 8 | 25 | 41 | 59 | 76 | 80 | 84 | 65 | 27 | 5 | 0 |
| 8 | none | 10 | 27 | 41 | 52 | 72 | | | | | | |
| 9 | none | 3 | 10 | 18 | 28 | 44 | | | | | | |
| C 1 | none | 34 | 41 | 50 | 72 | 83 | | | | | | |
| C 2 | none | 0 | 0 | 25 | 41 | 69 | | | | | | |
| C 3 | 700/20 | 1 | 4 | 8 | 13 | 22 | 29 | 34 | 38 | 42 | 42 | 42 |

Table E below shows the NOx removal efficiency in (NO$_x$ conversion in %) at different temperatures in ° C. of the compositions prepared according to the examples (EX) as listed as well as for the compositions prepared according to comparative example 1 to 3 and 5 to 6 (C 1 to C 3 and C 5 to C6) after heat treatment (ageing) of the catalyst powder at 700° C./10 hours, optionally preheated at temperatures in ° C. for a time in hours as indicated in Table E.

TABLE E

| EX | Preheat-treatment of Vanadate [° C./hours] | [%] at 200° C. | [%] at 230° C. | [%] at 250° C. | [%] at 270° C. | [%] at 300° C. | [%] at 320° C. | [%] at 350° C. | [%] at 380° C. | [%] at 420° C. | [%] at 450° C. | [%] at 480° C. |
|---|---|---|---|---|---|---|---|---|---|---|---|---|
| 1 | 550/20 | 3 | 24 | 45 | 58 | 64 | 56 | 44 | 35 | 16 | 0 | 0 |
| 2 | none | 1 | 8 | 14 | 25 | 46 | 62 | 78 | 86 | 89 | 86 | 84 |
| 3 | 550/20 | 5 | 17 | 29 | 41 | 59 | 67 | 71 | 71 | 66 | 61 | 57 |
| 4 | 550/20 | 27 | 39 | 53 | 71 | 87 | 98 | 98 | 98 | 89 | 77 | 52 |
| 5 | none | 43 | 79 | 92 | 98 | 99 | 100 | 100 | 97 | 84 | 73 | 58 |
| 6 | None | 1 | 10 | 17 | 24 | 34 | 38 | 34 | 22 | 0 | | |
| 7 | None | 25 | 52 | 71 | 90 | 96 | 98 | 99 | 99 | 94 | 86 | 74 |
| 8 | None | 15 | 34 | 49 | 63 | 80 | | | | | | |
| 9 | None | 7 | 22 | 32 | 47 | 63 | | | | | | |
| C 1 | none | 6 | 22 | 31 | 45 | 58 | | | | | | |
| C 2 | none | 7 | 21 | 56 | 70 | 82 | | | | | | |
| C 3 | 700/20 | 2 | 6 | 12 | 20 | 38 | 50 | 65 | 72 | 73 | 71 | 69 |
| C 5 | none | 2 | 13 | 19 | 28 | 39 | | | | | | |
| C 6 | 700/20 | 0 | 0 | 0 | 0 | 0 | | | | | | |

Table F below shows the NOx removal efficiency in (NO$_x$ conversion in %) at different temperatures in ° C. of the compositions prepared according to the examples (EX) as listed as well as for the compositions prepared according to comparative examples 1, 3 and 7 (C1, C 3 and C7) after heat treatment (ageing) of the catalyst powder at 750° C./10 hours, optionally preheated at temperatures in ° C. for a time in hours as indicated in Table F.

TABLE F

| EX | Preheat-treatment of Vanadate [° C./hours] | [%] at 200° C. | [%] at 230° C. | [%] at 250° C. | [%] at 270° C. | [%] at 300° C. | [%] at 320° C. | [%] at 350° C. | [%] at 380° C. | [%] at 420° C. | [%] at 450° C. | [%] at 480° C. |
|---|---|---|---|---|---|---|---|---|---|---|---|---|
| 5 | none | 28 | 53 | 84 | 96 | 99 | 99 | 99 | 96 | 84 | 71 | 51 |
| 8 | none | 11 | 29 | 42 | 57 | 78 | | | | | | |
| 9 | none | 7 | 25 | 41 | 57 | 77 | | | | | | |
| C 1 | none | | | 0 | | | 13 | | | 10 | | |
| C 3 | 700/20 | 2 | 7 | 14 | 25 | 47 | 61 | 75 | 77 | 75 | 73 | 72 |
| C 7 | 550/24 | 9 | 25 | 37 | 49 | 60 | | | | | | |

Table G below shows the NOx removal efficiency in (NO$_x$ conversion in %) at different temperatures in ° C. of the compositions prepared according to the example (EX) as listed as well as for the compositions prepared according to comparative example 4 and 5 (C 4 and C 5) after heat treatment (ageing) of the catalyst powder at 800° C./10 hours, optionally preheated at temperatures in ° C. for a time in hours as indicated in Table G:

TABLE G

| EX | Preheat-treatment of Vanadate [° C./hours] | [%] at 200° C. | [%] at 230° C. | [%] at 250° C. | [%] at 270° C. | [%] at 300° C. | [%] at 320° C. | [%] at 350° C. | [%] at 380° C. | [%] at 420° C. | [%] at 450° C. | [%] at 480° C. |
|---|---|---|---|---|---|---|---|---|---|---|---|---|
| 10 | none | 4 | 12 | 21 | 34 | 56 | 69 | 82 | 88 | 89 | 85 | 79 |
| C 4 | 850/20 | 2 | 8 | 17 | 31 | 63 | 79 | 88 | 88 | 83 | 80 | 77 |
| C 5 | none | 0 | 0 | 0 | 0 | 0 | 0 | 0 | 0 | 0 | 0 | 0 |

The Examples numbers 1 to 10 herein correspond to the compound numbers 1 to 10.

The vanadate species in Tables A, B, D, E, F and G for the respective examples (EX) 1 to 10 and comparative examples (EX) C 1 to C 7 indicated in the Tables correspond to the vanadate species in the compositions prepared according to examples 1 to 10 and comparative examples 1 to 7, respectively, and are summarized in Table H below:

TABLE H

| Example | Vanadate Species |
|---|---|
| 1 | $AlVO_4$ |
| 2 | $BiVO_4$ |
| 3 | $Al_{0.5}Bi_{0.5}VO_4$ |
| 4 | $SbVO_4$ |
| 5 | Gallium vanadate |
| 6 | $Bi_{0.5}Fe_{0.5}VO_4$ |
| 7 | $Bi_{0.1}Fe_{0.4}Er_{0.5}VO_4$ |
| 8 | $Al_{0.2}Fe_{0.8}VO_4$ |
| 9 | $Al_{0.2}Er_{0.8}VO_4$ |
| 10 | $Al_{0.1}Fe_{0.4}Er_{0.5}VO_4$ |
| C 1 | $V_2O_5$ |
| C 2 | $ErVO_4$ |
| C 3 | $ErVO_4$ |
| C 4 | $ErVO_4$ |
| C 5 | $FeVO_4$ |
| C 6 | $FeVO_4$ |
| C 7 | $FeVO_4$ |

The invention claimed is:

1. A catalyst composition comprising a vanadate represented by formula (I):

$$XVO_4/S \qquad (I)$$

wherein $XVO_4$ stands for
a mixture of one or more of a Bi-, Sb-, Ga- and/or Al-vanadate with one or more rare earth metal-vanadates,
wherein the one or more rare earth metal-vanadates is one or more of Er, Gd, Sm, Y,
and
S is a support comprising $TiO_2$.

2. The catalyst composition of claim 1, wherein the one or more rare earth metal-vanadates is Er.

3. A catalyst composition, comprising a vanadate represented by formula (I):

$$XVO_4/S \qquad (I)$$

wherein $XVO_4$ stands for a mixture of one or more of a Bi-, Sb-, Ga- and/or Al-vanadate with one or more transition metal-vanadates,
wherein the one or more transition metal-vanadates is one or more of Fe, Mn, Zr, and
S is a support comprising $TiO_2$.

4. The catalyst composition of claim 3, wherein the one or more transition metal-vanadates is Fe.

* * * * *